US006106904A

United States Patent [19]

Strotmann et al.

[11] Patent Number: 6,106,904

[45] Date of Patent: Aug. 22, 2000

[54] METHOD FOR PROMOTING ADHESION BETWEEN A BACKING AND AN ADHESIVE COMPOSITION

[75] Inventors: Markus Strotmann; Renke Bargmann, both of Hamburg; Jörn Leiber, Heiligenstedtenerkamp; Oliver Selaff, Geesthacht, all of Germany

[73] Assignee: Beiersdorf AG, Hamburg, Germany

[21] Appl. No.: 09/276,341

[22] Filed: Mar. 25, 1999

[30] Foreign Application Priority Data

Apr. 4, 1998 [DE] Germany ........................... 198 15 182

[51] Int. Cl.[7] ........................................................ C08J 7/18

[52] U.S. Cl. ................... 427/491; 427/208.4; 427/208.8; 427/244; 427/294; 427/407.1; 427/411; 427/488; 427/569

[58] Field of Search ..................................... 427/488, 491, 427/569, 208.4, 208.8, 294, 411, 244, 407.1

[56] References Cited

U.S. PATENT DOCUMENTS 5,718,967 2/1998 Hu et al. .

FOREIGN PATENT DOCUMENTS

3147986A1 6/1983 Germany ......................... H05H 1/46
3521625A1 12/1986 Germany ......................... H05H 1/46
2110870 6/1983 United Kingdom ............. H01J 11/00

OTHER PUBLICATIONS

Derwent abstract of DE 3521625 no date avail.

Derwent abstract of 3147986 no date avail.

Derwent abstract of GB 2110870 no date avail.

*Primary Examiner*—Bernard Pianalto
*Attorney, Agent, or Firm*—Norris, McLaughlin & Marcus, P.A.

[57] ABSTRACT

Process for producing adhesion promoter layers on a material in web form, characterized in that the adhesion promoter layers are applied to the web-form material by means of low-pressure plasma polymerization, the material in web form being guided continuously through a plasma zone in which there is a low-pressure plasma which is generated by electrical discharge, especially kHz, MHz or GHz discharge.

12 Claims, 2 Drawing Sheets

METHOD FOR PROMOTING ADHESION BETWEEN A BACKING AND AN ADHESIVE COMPOSITION

Figure 1:
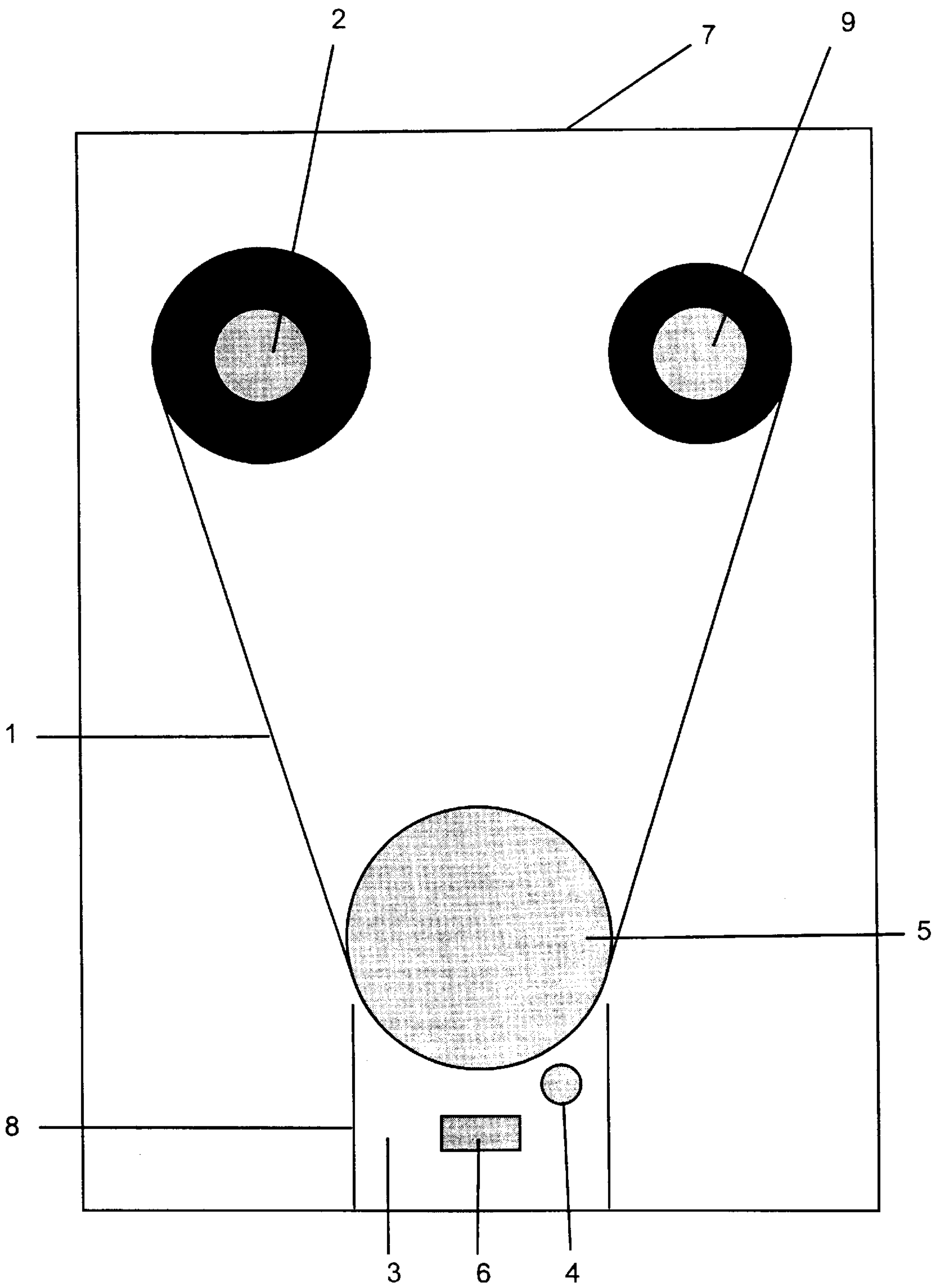

The invention relates to a process for producing adhesion promoter layers on a material in web form and to the use of the adhesion promoter layers, especially for adhesive tapes.

It is known that adhesion promoter layers on materials in web form are employed for a large number of different applications. Examples are packaging materials, adhesive tapes or protective films, where adhesion promoter layers are intended in each case to provide sufficient strength of the laminate.

In the case of adhesive tapes, this is often associated with particular problems since, in general, stringent requirements are set for the adhesion between adhesive composition and backing material. Detachment of the adhesive composition from the backing should occur neither during the removal of the adhesive tape from the roll (prior to use) nor when detaching the adhesive tape from whatever substrates (after use).

In order to increase the adhesion of layers to materials in web form, especially that of adhesive compositions to backing materials in the case of adhesive tapes, various techniques are employed.

These techniques are either processes for pretreating the materials in web form or for coating them with adhesion-promoting layers. Pretreatment processes employed include corona treatment, flame pretreatment, fluorination, or low-pressure plasma treatment. Adhesion-promoting layers, which are also referred to as primers, can be applied, for example, as a wet-chemical coating from solution (solvent or water), in which case subsequent drying and/or crosslinking is required.

All processes for increasing the adhesion have specific disadvantages. Corona and flame pretreatment are in many cases not sufficiently effective to achieve adequate adhesion of subsequent coatings on the materials in web form. An example is the adhesion of acrylate-based adhesive compositions to polyolefin-based materials in web form. Similar comments apply to fluorination, which is also associated with high safety-related expense.

A further disadvantage of flame pretreatment is the high thermal stress on the materials to be treated, making it impossible, or possible only under certain circumstances, to treat temperature-sensitive materials, in particular.

By means of the low-pressure plasma pretreatment, which is carried out with non-polymerizing gases (e.g. noble gases, oxygen or nitrogen), it is generally possible to obtain better adhesions than by means of a flame or corona pretreatment. What are problematic, however, are the high costs for the necessary vacuum equipment, especially when treating materials in web form. In many cases, the increase in adhesion is, moreover, lower than in the case of wet-chemical primers, so that in the case of materials in web form the use of a plasma pretreatment is not rational.

Low-pressure plasma polymerization has not so far been used for the industrial production of adhesion-promoting layers on materials in web form, although for fixed substrates, processes are already in existence for a large number of different applications. Examples are the coating of plastic bottles with permeation barrier layers, and the scratch-resistant coating of plastic surfaces. In the case of materials in web form, the use of low-pressure plasma polymerization has not generally been rational to date because the deposition rates are too low, resulting in a coating time of minutes or hours. For this reason, the production of coatings by means of low-pressure plasma polymerization in the case of materials in web form, and especially the production of adhesion promoter layers, is uneconomic.

The use of primers applied by wet-chemical means generally entails high costs, since treating the web-form material with a primer implies a complete additional coating operation. Furthermore, some primers are classified as unacceptable from environmental and health standpoints, especially since solvents are necessary for the wet-chemical application of the primers. A further problem is the use of wet-chemical primers with rough materials in web form, since in such cases it is difficult to achieve a constant, uniform layer thickness. Moreover, temperature-sensitive materials can be coated with wet-chemical primers only under certain circumstances, since economic primer drying in conjunction with the processing of materials in web form normally necessitates drying temperature of at least 80° C.

A further problem arises when a certain layer, for example a layer of adhesive composition, cannot be made to adhere sufficiently to a certain web-form material by any of the known processes.

The object of the invention is to avoid the disadvantages of the prior art or at least to lessen them. The object of the invention is, in particular, to achieve a marked increase in adhesion in the case of layers of adhesive composition on materials in web form, with the further requirements that the increase in adhesion must be stable in the long term, no solvents should be employed, and the process and the adhesion-promoting layers should be acceptable from the standpoints of both health and environment.

This object is achieved by a process for producing adhesion promoter layers on materials in web form, as is characterized in more detail in the main claim. The subclaims relate particularly to advantageous embodiments of the process. The invention additionally relates to the use of the adhesion promoter layers, especially for adhesive tapes.

The invention accordingly provides a process for producing adhesion promoter layers on a material in web form, characterized in that the adhesion promoter layers, which preferably are virtually or completely transparent, are applied to the web-form material by means of low-pressure plasma polymerization, the material in web form being guided continuously through a plasma zone in which there is a low-pressure plasma which is generated by electrical discharge, especially kHz, MHz or GHz discharge.

Important process parameters which govern the process for depositing the adhesion-promoting layers, and hence control the layer properties, are the monomers or carrier gases or additional gases employed, the gas pressure or gas-mixture pressure during coating, and the electrical discharge employed for plasma excitation. Varying the process parameters serves to optimize and adapt the adhesion promoter layers to the technical boundary conditions in each application case. In particular it is possible, through an appropriate choice of process parameters, as exemplified in the Examples, to achieve a marked increase in the deposition rate in comparison to the prior art, resulting in coating times of less than 1 second.

Coating is preferably carried out at a gas pressure or gas-mixture pressure of from $10^{-3}$ to 20 mbar.

It has also been found advantageous if pulsed electrical discharges are used to generate the plasma.

In a further advantageous embodiment, the web-form material is conveyed through the coating zone at a rate of more than 0.1 m/min, in particular more than 50 m/min.

In addition, the coating times are preferably shorter than one minute, in particular lower than one second.

It is advantageous if the unwinding station of the web-form material, the winding station, and the plasma zone are located in a vacuum chamber (batch operation), or the web-form material is guided through the plasma zone by means of vacuum locks, which is termed air-to-air operation.

Monomers used to form the low-pressure plasma are, in particular, saturated hydrocarbons having chain lengths from $C_1$ to $C_6$, especially methane, ethane or propane, and/or mono- or polyunsaturated hydrocarbons having chain lengths from $C_1$ to $C_6$, preferably acetylene or ethylene, and/or oxygen- or heteroelement-substituted compounds of the saturated or unsaturated hydrocarbons, such as ethylene oxide, for example.

Carrier gases or additional gases employed are preferably non-polymerizable gases such as noble gases, oxygen, hydrogen, nitrogen or compounds, or gas mixtures.

Additional gases and carrier gases are used in order to control layer deposition and, in particular, in order to increase the uniformity and stability of the plasma.

Materials in web form that are employed are preferably polymer films, foam substrates, woven substrates, non-woven substrates or paper substrates.

The use of the adhesion promoter layers produced by the process of the invention has been found to be particularly advantageous in the case of at least one-sided adhesive tapes, for promoting adhesion between backing and adhesive composition.

Strong promotion of the adhesion is a particular feature of the joining of web-form materials and acrylate-based adhesive compositions.

Various forms of electrical discharge can be utilized for plasma excitation, preferably kHz, MHz or GHz. The choice of form of excitation is governed by the boundary conditions of the process: for example, required coating rate or gas-mixture pressure during coating.

A particular advantage of the process over the prior art is the possibility of controlling the process of layer deposition, and hence the adhesion-promoting effect of the coatings, by varying the process parameters. This allows for optimum adaptation of the layer properties to the particular application case.

A further advantage of the novel process is the absence of solvent and the possibility of avoiding the use of substances unacceptable from a health or environmental standpoint.

Yet another advantage of the process is the possibility of coating rough web-form materials uniformly with adhesion promoter layers.

Furthermore, the thermal stress on the web-form materials is low because of the low-pressure plasma that is employed, so that temperature-sensitive materials in particular, such as polyethylene, polypropylene or foams, can be coated without damage.

A further advantage is the high long-term stability of the novel adhesion promoter layers: because of the novel process, these layers are highly crosslinked and thermally stable. Moreover, they are insoluble in customary solvents, so that their use, especially for promoting adhesion between web-form materials and coatings applied by wet-chemical means, leads to very good results.

The intention of the text below is to illustrate particularly advantageous embodiments of the process of the invention, without thereby wishing to impose any unnecessary restriction.

Figure 2:
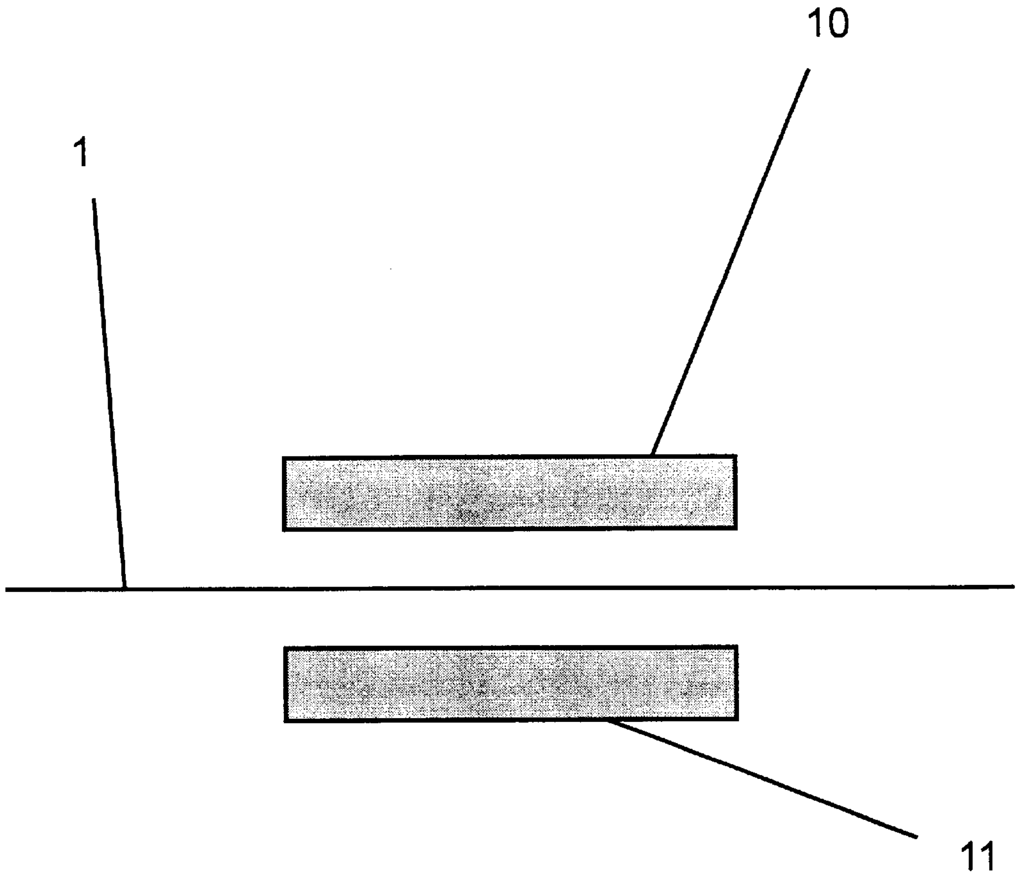

FIG. 1 shows the composition of a vacuum coating unit in accordance with the invention and FIG. 2 shows an alternative setup of the electrodes from FIG. 1.

In accordance with FIG. 1, the web-form material 1 is conveyed from an unwinding station 2 through the plasma coating zone 3. Within the plasma coating zone 3, which is separated by partitions 8 from the remainder of the vacuum chamber 7, monomers are introduced by way of a monomer supply means 4. Plasma excitation, and hence the fragmentation of the monomers, takes place by way of a high-frequency alternating field which is applied between the electrodes 5 and 6. The electrode 5 is configured as an earthed cooling roll and hence serves at the same time for transportation of the web-form material 1. Finally, after coating, the web-form material 1 is passed to a winding station 9.

An alternative setup of the electrodes 10, 11 is shown in FIG. 2. In this figure, the two electrodes 10, 11 have a flat shape and the web-form material 1 is guided without contact through the electrode gap.

The selection of the particular electrode setup depends on the specific application case. In the case of plasma excitation by means of GHz discharge, the electrodes are to be replaced by corresponding GHz input.

Finally, the process of the invention is illustrated by way of example, again without wishing to impose any unnecessary restriction.

EXAMPLE 1

An adhesion promoter layer is applied by low-pressure plasma polymerization to a polyester film (Hostaphan RN 25 film from Hoechst AG, Frankfurt), transparent, 500 mm wide and with a thickness of 25 $\mu$m. Coating takes place in a unit corresponding to FIG. 1 with an acetylene flow of 500 sccm and an oxygen flow of 50 sccm at a process pressure of 0.5 mbar. The film is guided through the plasma zone (length 200 mm) at a rate of 100 m/min, giving a coating time of 0.12 sec with a layer thickness of 130 nm. Plasma excitation is by kHz discharge. Subsequently, a transparent acrylate adhesive composition (in-house polymer comprising 48% butyl acrylate, 48% ethylhexyl acrylate and 4% acrylic acid) is applied to the adhesion-promoting layer from solution (solvent acetone/petroleum spirit, adhesive application rate after drying: 40 g/m$^2$). Adhesion between adhesive composition and backing film is examined by means of an anchorage test. For this purpose, a strip of adhesive bearing the adhesion promoter layer of the invention and having a width of 20 mm is bonded to a PVC sheet and rolled on (steel rollers, 80 mm diameter, 2 kg weight, rolled backwards and forwards five times over the adhesive strip at about 10 m/min). Subsequently, the total assembly, comprising adhesive strip with adhesion promoter layer of the invention and PVC sheet, is stored for 3 days at 40° C. and an atmospheric humidity of less than 75%. Following storage, the adhesion between backing film and adhesive composition is tested by peeling off the test strip at a rate of 2400 mm/min at angles of 180° and 90°. By virtue of the adhesion-promoting layer of the invention, the adhesion between backing film and adhesive composition is increased significantly and to a surprisingly high and permanent extent, so that there is cohesive splitting of the adhesive composition during the test. Adhesion between the adhesive composition and backing film is therefore much better than in the case of comparative adhesive films with which, instead of the adhesion promoter layer of the invention, wet-chemical primers or a corona or flame pretreatment were employed. In the case of the comparative adhesive strips, adhesive failure between backing film and adhesive composition was observed in all cases, and hence a markedly poorer adhesion between adhesive composition and backing film.

EXAMPLE 2

An adhesion promoter layer is applied by low-pressure plasma polymerization to a polypropylene film, transparent, 500 mm wide and with a thickness of 25 μm. Coating takes place in a unit corresponding to FIG. 1 with an acetylene flow of 500 sccm at a process pressure of 3 mbar. The film is guided through the plasma zone (length 200 mm) at a rate of 50 m/min, giving a coating time of 0.24 sec with a layer thickness of 180 nm. Plasma excitation is by MHz discharge. Subsequently, a transparent acrylate adhesive composition (in-house polymer comprising 47% butyl acrylate, 47% ethylhexyl acrylate and 6% acrylic acid) is applied to the adhesion-promoting layer from solution (solvent acetone/petroleum spirit, adhesive application rate after drying: 40 $g/m^2$). Adhesion between adhesive composition and backing film is examined by means of an anchorage test. For this purpose, strips of adhesive bearing the adhesion promoter layer of the invention and having a width of 20 mm are bonded to PVC sheets and rolled on (steel rollers, 80 mm diameter, 2 kg weight, rolled backwards and forwards five times over the adhesive strip at about 10 m/min). Subsequently, the total assembly, comprising adhesive strip with adhesion promoter layer of the invention and PVC sheet, is stored for 3 days at 40° C. and an atmospheric humidity of 50% and 100% respectively. Following storage, the adhesion between backing film and adhesive composition is tested by peeling off the test strips at a rate of 2400 mm/min at angles of 180° and 90°. By virtue of the adhesion-promoting layer of the invention, the adhesion between backing film and adhesive composition is increased significantly and to a surprisingly high and permanent extent, so that there is cohesive splitting of the adhesive composition during the test. Adhesion between the adhesive composition and backing film is therefore much better than in the case of comparative adhesive films with which, instead of the adhesion promoter layer of the invention, wet-chemical primers or a corona or flame pretreatment were employed. In the case of the comparative adhesive strips, adhesive failure between backing film and adhesive composition was observed in all cases, and hence a markedly poorer adhesion between adhesive composition and backing film.

EXAMPLE 3

An adhesion promoter layer is applied by low-pressure plasma polymerization to a polypropylene film, transparent, 500 mm wide and with a thickness of 25 μm. Coating takes place in a unit corresponding to FIG. 1 with an ethylene flow of 1000 sccm at a process pressure of 0.5 mbar. The film is guided through the plasma zone (length 200 mm) at a rate of 20 m/min. Plasma excitation is by kHz discharge. Subsequently, a transparent acrylate adhesive composition (in-house polymer comprising 47% butyl acrylate, 47% ethylhexyl acrylate and 6% acrylic acid) is applied to the adhesion-promoting layer from solution (solvent acetone/petroleum spirit, adhesive application rate after drying: 20 $g/m^2$). Adhesion between adhesive composition and backing film is examined by means of an anchorage test. For this purpose, strips of adhesive bearing the adhesion promoter layer of the invention and having a width of 20 mm are bonded to PVC sheets and rolled on (steel rollers, 80 mm diameter, 2 kg weight, rolled backwards and forwards five times over the adhesive strip at about 10 m/min). Subsequently, the total assembly, comprising adhesive strip with adhesion promoter layer of the invention and PVC sheet, is stored for 3 days at 40° C. and an atmospheric humidity of 50% and 100% respectively. Following storage, the adhesion between backing film and adhesive composition is tested by peeling off the test strips at a rate of 2400 mm/min at angles of 180° and 90°. By virtue of the adhesion-promoting layer of the invention, the adhesion between backing film and adhesive composition is increased significantly and to a surprisingly high and permanent extent, so that there is cohesive splitting of the adhesive composition during the est. Adhesion between the adhesive composition and backing film is therefore much better than in the case of comparative adhesive films with which, instead of the adhesion promoter layer of the invention, wet-chemical primers or a corona or flame pretreatment were employed. In the case of the comparative adhesive strips, adhesive failure between backing film and adhesive composition was observed in all cases, and hence a markedly poorer adhesion between adhesive composition and backing film.

EXAMPLE 4

An adhesion promoter layer is applied by low-pressure plasma polymerization to a polypropylene film, transparent, 500 mm wide and with a thickness of 35 μm. Coating takes place in a unit corresponding to FIG. 1 with an acetylene flow of 500 sccm at a process pressure of 3 mbar. The film is guided through the plasma zone (length 200 mm) at a rate of 25 m/min, giving a coating time of 0.48 sec with a layer thickness of 750 nm. Plasma excitation is by pulsed MHz discharge at a pulse frequency of $10^3$ Hz and a duty factor of 0.3. Subsequently, a transparent acrylate adhesive composition (Primal PS 83 D, Rohm and Haas GmbH, Frankfurt) is applied to the adhesion-promoting layer from solution (solvent water, adhesive application rate after drying: 20 $g/m^2$). Adhesion between adhesive composition and backing film is examined by means of an anchorage test. For this purpose, strips of adhesive bearing the adhesion promoter layer of the invention and having a width of 20 mm are bonded to PVC sheets and rolled on (steel rollers, 80 mm diameter, 2 kg weight, rolled backwards and forwards five times over the adhesive strip at about 10 m/min). Subsequently, the total assembly, comprising adhesive strip with adhesion promoter layer of the invention and PVC sheet, is stored for 3 days at 40° C. and an atmospheric humidity of 50% and 100% respectively. Following storage, the adhesion between backing film and adhesive composition is tested by peeling off the test strips at a rate of 2400 mm/min at angles of 180° and 90°. By virtue of the adhesion-promoting layer of the invention, the adhesion between backing film and adhesive composition is increased significantly and to a surprisingly high and permanent extent, so that there is cohesive splitting of the adhesive composition during the test. Adhesion between the adhesive composition and backing film is therefore much better than in the case of comparative adhesive films with which, instead of the adhesion promoter layer of the invention, wet-chemical primers or a corona or flame pretreatment were employed. In the case of the comparative adhesive strips, adhesive failure between backing film and adhesive composition was observed in all cases, and hence a markedly poorer adhesion between adhesive composition and backing film.

EXAMPLE 5

An adhesion promoter layer is applied by low-pressure plasma polymerization to a foam backing (Alveolit TEE 1000.8, Alveo AG, Lucerne, Switzerland), 300 mm wide and with a thickness of 600 $\mu$m. Coating takes place in a unit corresponding to FIG. 1 with an acetylene flow of 500 sccm and an argon flow of 50 sccm at a process pressure of 0.5 mbar. The film is guided through the plasma zone (length 200 mm) at a rate of 20 mm/min, giving a coating time of 0.6 sec. Plasma excitation is by kHz discharge. Subsequently, a transparent acrylate adhesive composition (in-house polymer comprising 47% butyl acrylate, 47% ethylhexyl acrylate and 6% acrylic acid) is applied to the adhesion-promoting layer from solution (solvent acetone/petroleum spirit, adhesive application rate after drying: 50 g/m$^2$). Adhesion between adhesive composition and backing film is examined by means of an anchorage test. For this purpose, an adhesive strip bearing the adhesion promoter layer of the invention (width 20 mm), as described in Example 1, laminated to the foam backing bearing the adhesion promoter layer of the invention and the adhesive composition described. Subsequently, the total assembly, is stored in a drying cabinet for 3 days at 40° C. and an atmospheric humidity of 50%. Following storage, the adhesion between foam backing and adhesive composition is tested by peeling off the test strip. By virtue of the adhesion-promoting layer of the invention, the adhesion between backing film and adhesive composition is increased significantly and to a surprisingly high and permanent extent, so that there is cohesive splitting of the foam composition or detachment of the test strip. Adhesion between the adhesive composition and foam backing is therefore much better than in the case of comparative samples with which, instead of the adhesion promoter layer of the invention, a corona or flame pretreatment was employed. In the case of the comparative samples, adhesive failure between foam backing and adhesive composition was observed in all cases, and hence a markedly poorer adhesion.

EXAMPLE 6

An adhesion promoter layer is applied by low-pressure plasma polymerization to a polypropylene film, transparent, 500 mm wide and with a thickness of 35 $\mu$m. Coating takes place in a unit corresponding to FIG. 1 with an acetylene flow of 500 sccm at a process pressure of 3 mbar. The film is guided through the plasma zone (length 200 mm) at a rate of 100 m/min. Plasma excitation is by pulsed MHz discharge at a pulse frequency of $10^3$ Hz and a duty factor of 0.3. Subsequently, a rubber adhesive composition (in-house polymer comprising 43% natural rubber, 3% Sillithin Z 86 white, 12% zinc oxide, 21% Escorez® 1202 (Exxon), 20% Escorez® 365 (Exxon), 0.4% AS MBI 2 PLV® (Bayer), 0.6% Sontal® (Bayer)) is applied to the adhesion-promoting layer from solution (adhesive application rate after drying: 20 g/m$^2$). Adhesion between adhesive composition and backing film is examined by means of an anchorage test. For this purpose, strips of adhesive bearing the adhesion promoter layer of the invention and having a width of 20 mm are bonded to PVC sheets and rolled on (steel rollers, 80 mm diameter, 2 kg weight, rolled backwards and forwards five times over the adhesive strip at about 10 m/min). Subsequently, the total assembly, comprising adhesive strip with adhesion promoter layer of the invention and PVC sheet, is stored for 3 days at 40° C. and an atmospheric humidity of 50%. Following storage, the adhesion between backing film and adhesive composition is tested by peeling off the test strips at a rate of 2400 mm/min at angles of 180° and 90°. By virtue of the adhesion-promoting layer of the invention, the adhesion between backing film and adhesive composition is increased significantly and to a surprisingly high and permanent extent, so that the test strips can be completely detached again. Adhesion between the adhesive composition and backing film is therefore much better than in the case of comparative adhesive films with which, instead of the adhesion promoter layer of the invention, wet-chemical primers or a corona or flame pretreatment were employed. In the case of the comparative adhesive strips, adhesive failure between backing film and adhesive composition was observed in all cases, and hence a markedly poorer adhesion between adhesive composition and backing film.

What is claimed is:

1. A method for producing an adhesive tape comprising a backing and an adhesive composition, which comprises passing a backing material through a plasma zone while flowing a hydrocarbon having a chain length of $C_1$ to $C_6$ through the plasma zone, together with a carrier gas, and generating a low-pressure plasma from said hydrocarbon in said plasma zone by electrical discharge, to polymerize said hydrocarbon on said backing and form a polymeric coating on said backing, and then applying a coating of an adhesive composition to said polymeric coating.

2. Method according to claim 1, wherein the gas pressure in said plasma zone is from $10^{-3}$ to 20 mbar.

3. Method according to claim 1, wherein pulsed electrical discharges are used to generate the plasma.

4. Method according to claim 1, wherein the backing material is conveyed through the zone at a rate of more than 0.1 m/min.

5. Method according to claim 1, wherein the residence time in said plasma zone is shorter than one minute.

6. Method according to claim 1, wherein the backing material is provided to the plasma zone from an unwinding station, and taken up from the plasma zone by a winding station and the unwinding station of the backing material, the winding station and the plasma zone are all located in a vacuum chamber.

7. Method according to claim 1, wherein the backing material is guided through the plasma zone by means of vacuum locks.

8. Method according to claim 1, wherein the hydrocarbons used to form the low-pressure plasma are saturated hydrocarbons, mono- or polyunsaturated hydrocarbons, or heteroelement-substituted compounds of the saturated or unsaturated hydrocarbons.

9. Method according to claim 1, wherein said carrier gases are non-polymerizable gases or gas mixtures.

10. Method according to claim 1, wherein the adhesion promoter layers are virtually or completely transparent.

11. Method according to claim 1, wherein the backing material is polymer film, foam substrate, woven substrate, non-woven substrate or paper substrate.

12. A method for promoting adhesion between a backing and an adhesive composition which comprises treating said backing by passing it through a plasma zone while flowing a hydrocarbon having a chain length of $C_1$ to $C_6$ through the plasma zone, together with a carrier gas, and generating a low-pressure plasma from said hydrocarbon in said plasma zone by electrical discharge, to polymerize said hydrocarbon on said backing and form a polymeric coating on said backing, and then applying the adhesive composition to said polymeric coating.

* * * * *